O. C. FRICK.
FEED CUTTER.
APPLICATION FILED DEC. 23, 1911.

1,043,918.

Patented Nov. 12, 1912.

Witnesses:
J. A. Otto
J. D. Bremer

Inventor
Orlando C. Frick
By Brown & Wheeler
Attorneys.

UNITED STATES PATENT OFFICE.

ORLANDO C. FRICK, OF MANITOWOC, WISCONSIN, ASSIGNOR TO SMALLEY MANUFACTURING CO., OF MANITOWOC, WISCONSIN, A CORPORATION OF WISCONSIN.

FEED-CUTTER.

1,043,918.   Specification of Letters Patent.   Patented Nov. 12, 1912.

Application filed December 23, 1911. Serial No. 667,466.

*To all whom it may concern:*

Be it known that I, ORLANDO C. FRICK, a citizen of the United States, residing at Manitowoc, county of Manitowoc, and State of Wisconsin, have invented new and useful Improvements in Feed-Cutters, of which the following is a specification.

My invention relates to improvements in feed cutters.

The revolving motion of feed cutter knives is frequently checked or wholly stopped by the material, this being due to careless feeding, whereby too great a quantity of material is fed between the knives, or to the presence in the material of some object through which the knives cannot cut, at least without considerable loss in speed. As the feeding conveyer of a feed cutter is ordinarily driven from the knife shaft, the sudden stopping thereof, (particularly of the blower where a wind stacker is employed), subjects the sprocket chains to heavy strains, and allows the material in the blower and stacker tube to drop back and clog the tube or fan. This makes it necessary to clean out the tube and blower manually before again starting the machine.

In a former Patent Number 292182, dated January 22nd, 1884, mechanism is shown and described which permits the fly wheel to be released and run free, thus avoiding the effects of its momentum in case of a sudden stoppage of the knives, and the object of my present invention is to provide means whereby the driving pulley is allowed to be released and continue in motion and the blower to be driven continuously therefrom, notwithstanding the stoppage of the knives and knife shaft.

With the above object in view, the driving sprocket wheel of the blower actuating chain is not mounted upon the knife shaft in accordance with the usual custom, but it is mounted upon a clutch member which runs loose on such shaft and which is coupled directly with the hub of the driving pulley. The latter is releasably connected with the knife shaft and adapted to run free in case the knives are stopped suddenly, the sudden shock being utilized to cause the release of the pulley. The blower and any other mechanism connected with the pulley, will thereupon be continuously driven until manually stopped, whereupon the pulley will again be placed in operative relation to the knives, the obstruction in the path of the knives having meanwhile been removed.

Figure 1:
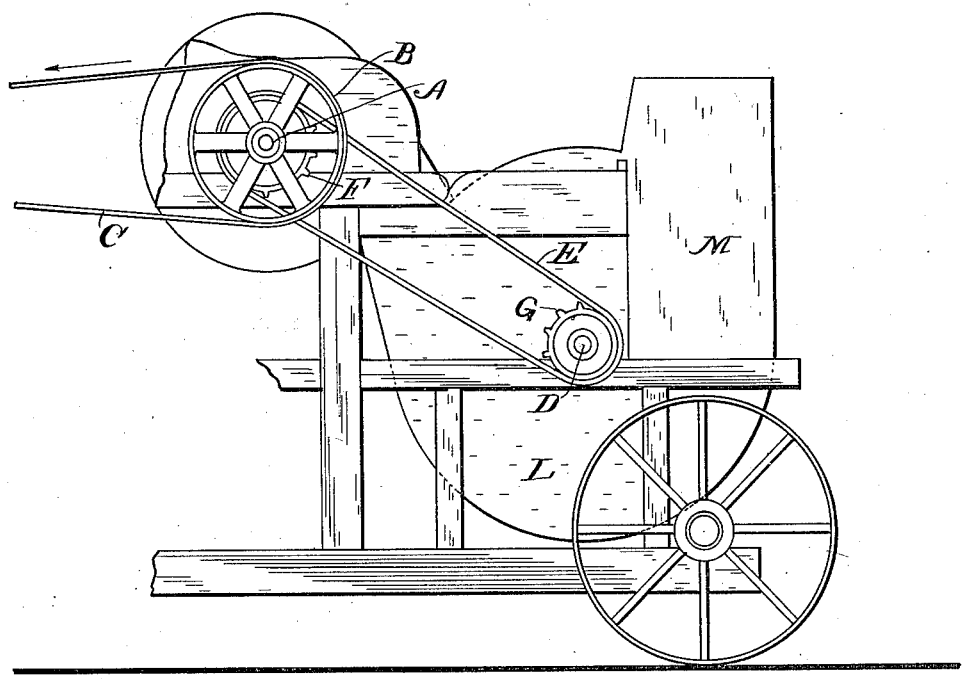
Figure 2:
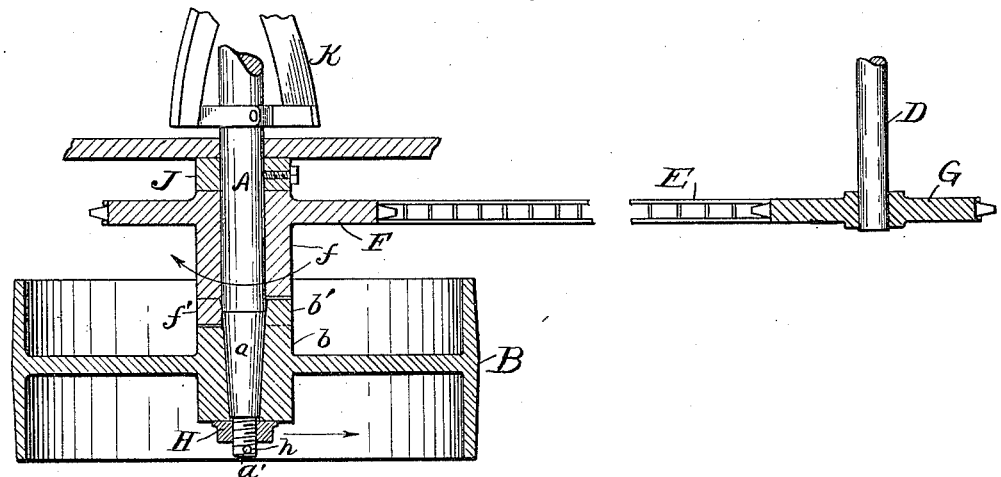

In the drawings:—Figure 1 is a side elevation of a feed cutter showing the general relation of the parts in which my invention is embodied. Fig. 2 is a horizontal detail sectional view, showing a portion of the knife and blower shafts and knives, the sprocket wheel, together with the coupling members, and driving pulley.

Like parts are identified by the same reference characters in both views.

A is the knife shaft of a feed cutter.

B is a driving pulley, C a driving belt, and D is the shaft of a blower driven from the shaft A by a sprocket chain E which runs over sprocket pulleys F and G on the knife shaft and blower shaft respectively. The sprocket pulley F, however, is not connected directly with the knife shaft A, but is loose thereon. Its hub $f$ constitutes the driven member of a clutch of which the hub $b$ of the pulley B constitutes the driving member. These members are provided with interlocking teeth $b'$ and $f'$ respectively, whereby the rotation of the pulley hub $b$ is imparted to the sprocket hub $f$.

The knife shaft A is provided with a tapered extremity $a$, which fits in a correspondingly tapered socket in the pulley hub $b$. A clamping nut H is threaded upon the reduced extremity $h$ of the shaft A in the same direction as that in which the pulley turns, and this nut H bears against the outer end of the pulley hub $b$ to bind or wedge the hub $b$ on the tapered end of the shaft so as to rotate the same. The inner end of the sprocket wheel hub $f$ seats against a collar J which is fixed upon the shaft A and rotates with it. The knives K are also connected with the shaft A in the usual manner to rotate with it.

With the above described construction, if the knives K strike an obstruction which they cannot cut, the shaft A is immediately stopped. The shock of stopping causes the release of pulley B which, by its own inertia and that of the parts connected with it, tends to continue in rotation. As the pulley B is not keyed to the shaft A, it commences to rotate independently when the shaft is suddenly stopped, and this rotation of the pulley causes the nut H to unscrew sufficiently to relieve the pulley hub from binding pressure upon the tapered portion $a$ of the shaft so that the pulley runs freely on the shaft. The nut H may rotate or unscrew until it strikes a cross pin or key $a'$, which projects from the extremity of the shaft A. This limits the outward movement of the nut H, and not only prevents the pulley B from leaving the shaft A, but also prevents it from moving outwardly longitudinally to such an extent as to release the clutch. The pulley B and sprocket wheel F will therefore continue to rotate, and the blower shaft D will be continuously driven until the driving mechanism is stopped manually. By thus continuing the blower in action after the knives have ceased rotating, the blower casing L and stacker tube M are cleared so that when the driving mechanism is brought to rest, no clogging results. The obstruction may then be removed from the knives, nut H and pulley B may be again tightened upon the shaft A, and the machine thus restored to normal operative condition.

I claim—

1. The combination with the knives and blower of a feed cutter, said blower being operative to convey material cut by said knives, of a driving pulley independently connected with both the knives and the blower, and means for utilizing stopping shocks in the knives to automatically release the pulley therefrom while said driving pulley remains operative to drive said blower.

2. The combination with the knives and blower, knife shaft and blower shaft of a feed cutter, said blower being operative to convey material cut by said knives, of a driving pulley mounted upon the knife shaft, and having independent motion transmitting connection with the blower shaft, and means for binding the pulley upon the knife shaft, in motion transmitting relation thereto; said binding means being adapted to release the pulley for free rotation upon the knife shaft while said pulley remains operative to drive said blower in case the motion of the knife shaft is suddenly checked.

3. The combination with the knives and knife shaft of a feed cutter, of a driving pulley provided with a driving clutch member, a driven clutch member loose on said shaft and interlocking with the driving clutch member, and means for releasably securing the pulley to said shaft and releasing the same for independent rotation under stopping shocks in the knife shaft, together with a blower for delivering the cut feed, and power transmitting connections between the driven clutch member and said blower.

4. The combination with the knives of a feed cutter, of a knife shaft having a tapered end portion, a driving member having a hub provided with a tapered bore, a nut threaded on the extremity of the shaft in the direction of normal rotation of the driving member and adapted to bear upon said driving member to cause it to bind upon the tapered shaft end, and power transmitting connections operatively connected to be driven from said driving member independently of the shaft whereby the same may be continuously driven notwithstanding a stoppage of the knife shaft.

5. The combination with the knives of a feed cutter, of a knife shaft provided with a tapered end portion, a driving pulley having a tapered socket, adapted to seat with binding pressure upon said tapered shaft portion, a nut threaded upon the extremity of the shaft beyond the tapered portion, and binding against the pulley hub, means for limiting the outward movement of the nut, a clutch member loose on the shaft, and adapted for interlocking engagement with the pulley, and power transmitting connections operatively connected to be driven from said clutch member.

6. The combination with the knives and knife shaft of a feed cutter provided with a tapered end portion, of a driving pulley having a tapered socket, adapted to seat with binding pressure upon said tapered shaft portion, a nut threaded upon the extremity of the shaft beyond the tapered portion, and binding against the pulley hub, and means for limiting the outward movement of the nut, together with a clutch member loose on the shaft, loosely interlocked with the pulley, and adapted to remain in interlocking engagement during the outward movement of the nut, and a blower operatively connected with said clutch member.

In testimony whereof I affix my signature in the presence of two witnesses.

ORLANDO C. FRICK.

Witnesses:
 HILDA HENRIKSON,
 C. E. BRADY.

---

Copies of this patent may be obtained for five cents each, by addressing the "Commissioner of Patents, Washington, D. C."